UNITED STATES PATENT OFFICE 2,373,105

VITAMIN K COMPOUNDS AND PROCESS OF OBTAINING SAME

Edward A. Doisy and Donald W. MacCorquodale, Webster Groves, and Sidney A. Thayer, Stephen B. Binkley, and Ralph W. McKee, St. Louis, Mo., assignors to President and Board of Trustees of St. Louis University, St. Louis, Mo.

No Drawing. Application June 7, 1939, Serial No. 277,774

13 Claims. (Cl. 260—488)

The invention relates to a method of obtaining compounds having antihemorrhagic or vitamin K activity, whereby intermediate compounds of greater stability than the vitamins from which they are derived are produced.

It is known that vitamin K products and concentrates are obtainable from various animal and vegetable materials, such as alfalfa, spinach, soybean oil, liver, putrified fish meal, etc. On the other hand, it is also known that the antihemorrhagic vitamins are labile substances which are subject to inactivation in greater or lesser amounts during the usual processes of extraction, adsorption, distillation, etc., used for isolating them.

The present invention overcomes, to a great extent, the objections mentioned in the processes heretofore used, by reacting the vitamin K in its relatively crude form with an esterifying or etherifying agent, either during or after reduction of quinone groups to hydroquinone groups, to obtain an ester or an ether of the reduced form of the vitamin which, because it is more stable than the vitamin, is then subjected to the known methods of concentration and purification with practically no loss of activity. After the reduced and esterified, or etherified, derivative has been sufficiently concentrated, it can be converted back into a purified vitamin product by hydrolysis and oxidation. Instead of converting the derivative back into the vitamin from which it was obtained, the derivative can, in many instances, be directly used for therapeutic purposes, since it has been found that the derivatives often have high antihemorrhagic potency, in some cases having activity of the same order as the original vitamin itself.

The invention is not limited to the use of crude or impure vitamin K products as starting materials, since it is possible to start with a pure vitamin K, as obtained for example by isolation from a natural source or by synthesis, convert this by reduction and esterification or etherification into the ester or ether, and use the latter for its vitamin K effect. An advantage in such cases is that the ether or ester obtained has greater stability than the natural vitamin from which it was derived.

Vitamin K activity is exhibited by a number of different substances. However, apparently all of them have a quinone-like chemical structure, and are capable of reduction to hydroquinone-like compounds. The present invention can therefore be more fully understood by considering the esterification or etherification step of the present invention as a replacement of phenolic hydroxyl groups in the reduced or hydroquinone form of the vitamin by groups capable of hydrolysis to give hydroxyl such as —O—Acyl, —O—Alkyl, —O—Aryl, —O—Aralkyl, —Halide, —O—Cycloalkyl, etc.

The invention can be illustrated by the following examples:

Example 1

The starting material for this example is vitamin $K_1$, a pure antihemorrhagic vitamin described in our publication in the Journal of the American Chemical Society, 61, 1295, and obtained by petroleum ether extraction of dried alfalfa meal and subsequent purification by adsorption on a zeolite. Such a product is hereinafter designated as vitamin $K_1$. It is an oil at ordinary temperatures, having a polyene structure which absorbs 4 moles of hydrogen upon catalytic reduction, exhibits ultraviolet absorption spectrum maxima (hexane solution) at 243, 248, 261, 270, and 323 m$\mu$ and has an antihemorrhagic potency of approximately 1 chick unit per 0.5 microgram.

100 milligrams of this vitamin $K_1$ are dissolved along with 100 mg. of fused sodium acetate in 10 cc. of acetic anhydride. The solution is then refluxed with 1 gram of zinc dust for 30 minutes. An additional 1 g. of zinc dust is added, a few milligrams at a time, during the period of heating. The mixture is filtered while hot. The acetic anhydride filtrate is decomposed by the addition of 20 to 30 cc. of water. After decomposition has taken place, the mixture is extracted with ether, the ether extract is washed with water and evaporated to dryness. The residue is then taken up in and recrystallized from absolute methyl alcohol at —5° C. The product can also be crystallized from low boiling petroleum ether (30–60° C.). It is very soluble in acetone, ethyl alcohol and benzene and can be recrystallized in the form of fine snow white needles from methyl alcohol or petroleum ether. It has a melting point of 59° C. and is pure diacetyl dihydro vitamin $K_1$. Analysis of the compound gives the following figures:

Carbon _____ per cent __ 78.21 and 78.01
Hydrogen _____ do ____ 10.07 and 10.03
Oxygen per cent __ 11.72 and 11.96 (by difference)
Molecular weight _____ 531 (Rast)

Microhydrogenation of a sample of the diacetyl dihydro vitamin $K_1$ causes it to take up 3.04 moles of hydrogen ($H_2$). The vitamin $K_1$ itself took up 4.08 moles of hydrogen.

Bio assay by the chick method shows that the diacetyl dihydro vitamin $K_1$ has an activity of about 500 units per mg.

Absorption spectrum examination of the diacetate of this example shows a general absorption in the region from 220 m$\mu$ to beyond 300 m$\mu$ with intense absorption at 230 m$\mu$ where the extinction coefficient is $$E_{1\ cm.}^{1\%} = 1300$$

The diacetate of this example is not readily hydrolyzed by alkali or acids in an aqueous or alcoholic medium. In alcoholic solution its activity is not destroyed by 100 hours exposure to the light from a 100 watt bulb at a distance of 4 feet. On the other hand, there is extensive destruction of the vitamin activity when vitamin $K_1$ itself is exposed under the same conditions and for the same length of time.

The diacetyl dihydro vitamin $K_1$ of this example is converted to vitamin $K_1$ by treating an anhydrous ether solution of the diacetyl dihydro compound with a 14 times excess of methyl magnesium iodide, adding water to hydrolyze to dihydro vitamin $K_1$, and shaking an ether solution of the latter with air to oxidize it to the corresponding quinone-like compound, vitamin $K_1$. After evaporating off the ether, the residue is fractionally distilled at $2 \times 10^{-4}$ mm. pressure. About 90% of the vitamin activity is obtained in the fraction distilling at 115–145° C. This fraction is practically pure vitamin $K_1$ and analyzes as follows:

Carbon _____ per cent __ 82.34
Hydrogen _____ do ____ 10.13
Oxygen _____ per cent __ 7.53 (by difference)

It has an antihemorrhagic activity in the chick test of 1,000 units per milligram.

That the vitamin $K_1$ produced by hydrolyzing the dihydro vitamin $K_1$ diacetate obtained in this example is identical with the pure vitamin $K_1$ started with is further proved by the fact that reductive acetylation can be repeated on it to give a diacetate of a dihydro vitamin having a melting point and giving results in a bio-assay identical with the original diacetate of dihydro vitamin $K_1$. The diacetate from the second reductive acetylation also does not give any lowering of the melting point in a mixed melting point test with the original diacetate of dihydro vitamin $K_1$.

*Example 2*

The starting material for this example is a petroleum ether extract of dried alfalfa leaf containing about 100 chick units of vitamin $K_1$ per milligram of solids. 250 mgs. of this concentrate are dissolved with 250 mg. of fused sodium acetate in 25 cc. of acetic anhydride. The solution is then refluxed with 3 gms. of zinc dust for 30 minutes. An additional 2 gms. of zinc dust is added, a few milligrams at a time, during the period of heating. The mixture is filtered while hot, the acetic anhydride filtrate is decomposed by the addition of 80–90 cc. of water. After the anhydride has been decomposed, the mixture is extracted with ether, the ether extract washed and evaporated to dryness. The residue is then taken up in 100 cc. of petroleum ether having a boiling point of 90–110° C. and passed through a column of an adsorbent such as Permutit or charcoal. One can use adsorbents such as alumina, fuller's earth, calcium carbonate, etc., which are known to cause extensive destruction of vitamin activity when used with vitamin $K_1$ itself. Using a column of Permutit 35 mm. in diameter by 40 cm. long, the 100 cc. of petroleum ether solution of the crude diacetate of dihydro vitamin $K_1$ is poured onto the top of the column, followed successively by about 2 liters of petroleum ether, 1½ liters of petroleum ether containing 10% of benzene, 1 liter of petroleum ether containing 20% benzene, 1 liter of petroleum ether containing 50% benzene, 2 liters benzene and 1 liter alcohol, collecting 500 cc. fractions at the bottom of the column. The purified diacetate of dihydro vitamin $K_1$ is found chiefly in the benzene fractions while most of the inactive material is obtained in earlier fractions. The solvent is removed from the active fractions, and the residue is taken up in and crystallized at low temperature from absolute methyl alcohol. After recrystallizing a few times it melts at 59° C. and is identical with the diacetate of Example 1. By combining the least active fractions and passing them through the column again it is possible to obtain practically quantitative recovery of all the vitamin activity in the form of substantially pure diacetate of dihydro vitamin $K_1$.

*Example 3*

Material for this example is designated as vitamin $K_2$ and is a crystalline product melting at 52° C. described in our publication in the Journal of the American Chemical Society, 61, 1295, and obtained by extracting putrified fish meal with an organic solvent and treating the extract with a zeolite adsorbent.

200 mg. of vitamin $K_2$ is dissolved along with 200 mg. of fused sodium acetate in 22 cc. of acetic anhydride. The solution is refluxed with 2 gm. of zinc dust for 30 minutes, adding an additional gram of zinc dust, a few milligrams at a time, during the period of heating. The hot mixture is filtered and the acetic anhydride filtrate decomposed by adding 50 cc. of water. After the anhydride has reacted with the water, the mixture is extracted with ether, the ether extract washed with water and evaporated to dryness. The residue is taken up in and recrystallized from cold absolute methanol and the diacetate of dihydro vitamin $K_2$ separates as a white crystalline product melting at 57–58° C.

The diacetate gives the following analysis:

Carbon _____ per cent __ 80.89 and 81.03
Hydrogen _____ do ____ 9.94 and 9.979
Oxygen __ per cent __ 9.17 and 8.99 (by difference)
Molecular weight _____ 628

Upon microhydrogenation, the diacetate takes up 7.99 mols. of hydrogen. Vitamin $K_2$ itself takes up approximately 9 mols. of $H_2$. The diacetate of dihydro vitamin $K_2$ assays approximately 300 chick units per mg. Ultraviolet absorption is very similar to that of the diacetate of Example 1. It has an extinction coefficient of $$E_{1\ cm.}^{1\%} = 1280 \text{ at } 232\ m\mu$$

*Example 4*

This example is carried out as described under Example 2, but using as starting material a crude petroleum ether extract of putrified fish meal containing 120 chick units of vitamin $K_2$ active material per milligram of solids. After the solvent is evaporated off of this extract, the crude vitamin $K_2$ residue is converted to the crude dihydro diacetate by reductive acetylation and then purified by an adsorbent as described under Example 2.

The diacetate products of Example 2 and of Examples 3 and 4 can be hydrolyzed and oxidized to get back pure vitamin K₁ and vitamin K₂ respectively, in the same manner as described under Example 1. Instead of using sodium acetate and acetic anhydride, other alkali metal carboxylates and carboxylic acids can be used. For example, by using a propionic acid, benzoic acid, chloroacetic acid, or succinic acid anhydride, along with the corresponding alkali metal salt, one can obtain the dihydro vitamin propionates, chloroacetates, succinates, etc.

The examples show that vitamin K which has been converted to its phenolic form and esterified or etherified is more stable than in its original quinone-like form. It can thereafter be treated, in accordance with the present invention, by any of the known methods of concentration and purification, such as adsorption, fractional distillation, fractional crystallization, etc., with practically no loss of vitamin activity.

Although the examples show simultaneous reduction and esterification of the vitamin, the invention also embodies the variation wherein the quinone-like vitamin is first reduced and then esterified or etherified. The two variations of the process can be represented diagrammatically as follows:

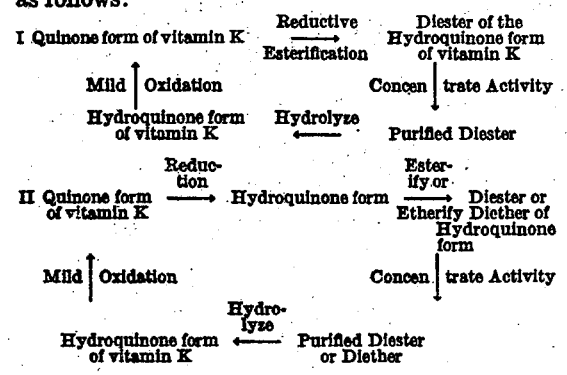

Reduction to the hydroquinone form can be accomplished by any of the known methods for converting a quinone to a dihydric phenol. For example, catalytic reduction or hydrogenation may be used. Also, reduction with sulfur dioxide, sodium hydrosulfite, titanous chloride, stannous chloride, and the like can be used.

What we claim as our invention is:

1. Process for obtaining an antihemorrhagic compound comprising treating a compound of the class consisting of vitamins K₁ and K₂ having a quinone-like chemical structure to reduce said compound to its hydroquinone form and to replace the phenolic hydroxyl group of the latter by a group capable of hydrolysis to give a hydroxyl group.

2. Process according to claim 1 in which the vitamin compound treated is vitamin K₁.

3. Process according to claim 1 in which the vitamin compound treated is vitamin K₂.

4. Process according to claim 1 in which the reduction and replacement of the hydroxyl group are simultaneous.

5. Process for obtaining an antihemorrhagic compound comprising reacting a compound of the class consisting of vitamins K₁ and K₂ having a quinone-like chemical structure with a reducing agent to obtain the corresponding hydroquinone-like compound and reacting the latter compound with an agent of the class consisting of esterifying and etherifying agents to obtain a compound of the class consisting of esterified and etherified dihydro derivatives of vitamins K₁ and K₂.

6. An ester of a compound of the class consisting of dihydro vitamin K₁ and dihydro vitamin K₂ in which the phenolic hydroxyl groups have been replaced by organic carboxylic acid groups capable of hydrolysis to give hydroxyl groups.

7. An ester of dihydro vitamin K₁ in which the phenolic hydroxyl groups have been replaced by organic carboxylic acid groups capable of hydrolysis to give hydroxyl groups.

8. An ester of dihydro vitamin K₂ in which the phenolic hydroxyl groups have been replaced by organic carboxylic acid groups capable of hydrolysis to give hydroxyl groups.

9. An unsubstituted organic lower carboxylic acid ester of dihydro vitamin K₁.

10. An unsubstituted organic lower carboxylic acid ester of dihydro vitamin K₂.

11. Diacetyl dihydro vitamin K₁ having a melting point of approximately 59° C.

12. Diacetyl dihydro vitamin K₂ having a melting point of approximately 57–58° C.

13. Process for obtaining an antihemorrhagic compound comprising treating a compound of the class consisting of vitamins K₁ and K₂ with zinc dust and acetic anhydride to obtain the diacetate of a dihydronaphthoquinone corresponding to the original vitamin K compound.

EDWARD A. DOISY.
DONALD W. MacCORQUODALE.
SIDNEY A. THAYER.
STEPHEN B. BINKLEY.
RALPH W. McKEE.